(12) United States Patent
Arisaka et al.

(10) Patent No.: US 6,749,142 B2
(45) Date of Patent: Jun. 15, 2004

(54) APPARATUS FOR WINDING SHEET-LIKE ELEMENT

(75) Inventors: Oomi Arisaka, Kanagawa (JP); Hitoshi Miyamae, Kanagawa (JP); Hironao Tachizawa, Aichi (JP); Jinya Kamada, Aichi (JP)

(73) Assignee: Piolax Inc., Yokohama (JP)

( * ) Notice: Subject to any disclaimer, the term of this patent is extended or adjusted under 35 U.S.C. 154(b) by 41 days.

(21) Appl. No.: 10/078,525

(22) Filed: Feb. 21, 2002

(65) Prior Publication Data

US 2002/0113158 A1 Aug. 22, 2002

(30) Foreign Application Priority Data

Feb. 22, 2001 (JP) ...................... P.2001-046139

(51) Int. Cl.[7] ............................................. B65H 75/48
(52) U.S. Cl. ...................... 242/381; 160/296; 160/305
(58) Field of Search ............................... 242/371, 381, 242/385.1, 396; 137/355.22; 254/377; 188/272, 283; 160/245, 305, 306, 296

(56) References Cited

U.S. PATENT DOCUMENTS

| | | | | |
|---|---|---|---|---|
| 1,056,616 A | * | 3/1913 | Wright et al. | 182/238 |
| 2,594,484 A | * | 4/1952 | Nixon | 242/381 |
| 3,041,044 A | * | 6/1962 | Nixon | 242/381 |
| 4,222,601 A | * | 9/1980 | White et al. | 296/37.16 |
| 4,466,475 A | * | 8/1984 | Saito et al. | 160/297 |
| 4,838,333 A | * | 6/1989 | Mottura | 160/305 |
| 5,853,040 A | * | 12/1998 | Benthin | 160/299 |
| 6,234,417 B1 | * | 5/2001 | Sauder et al. | 242/381 |

FOREIGN PATENT DOCUMENTS

JP  59-185148  12/1984

* cited by examiner

Primary Examiner—John M. Jillions
(74) Attorney, Agent, or Firm—McGinn & Gibb, PLLC

(57) ABSTRACT

A sheet-like element winding apparatus has an accommodating case 1, at one end portion of which a cap 2 is attached to, and also has a winding shaft 3, disposed in the accommodating case 1, for winding a sheet-like element, and a pushing means for rotating and pushing the winding shaft in a direction in which the sheet-like element is wound. A clutch mechanism is provided at an end portion of the winding shaft. When a sheet-like element is wound, the winding shaft is connected through the clutch mechanism to a damping means D1 for providing a damping force to the winding shaft. When a sheet-like element is drawn out, the connection between the winding shaft and the damping means is canceled through the clutch mechanism.

32 Claims, 11 Drawing Sheets

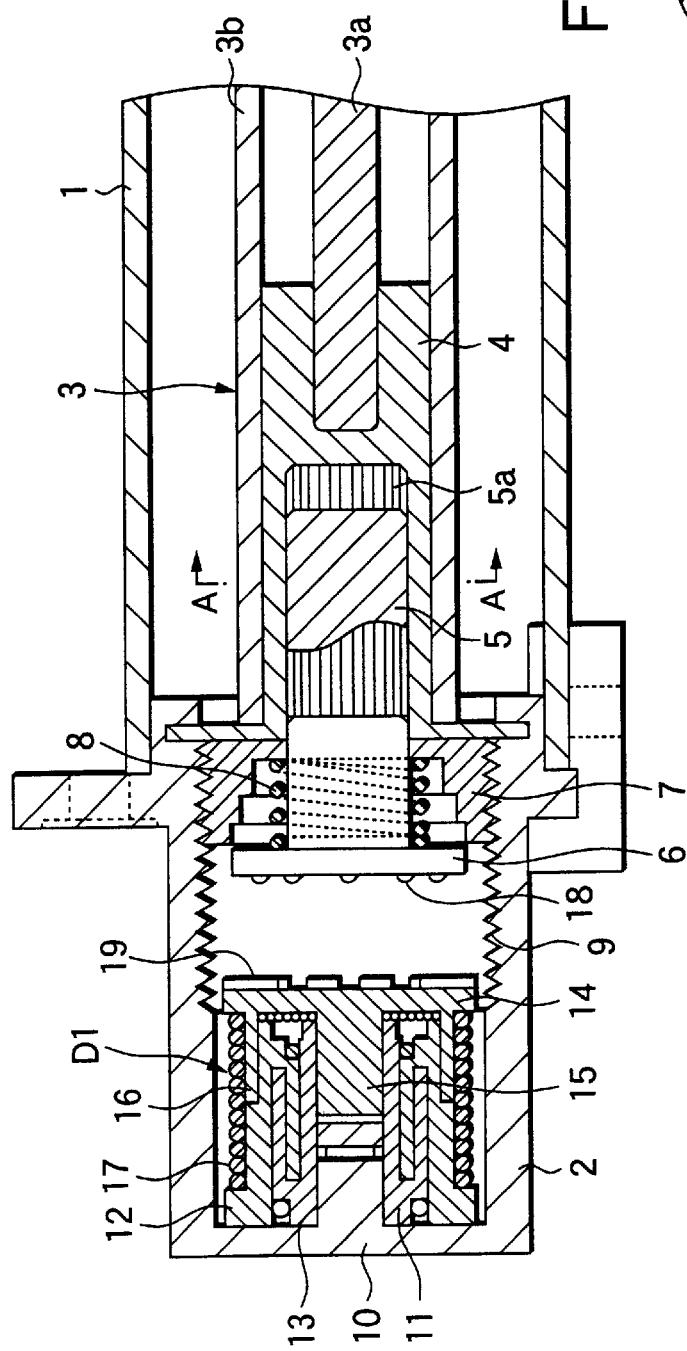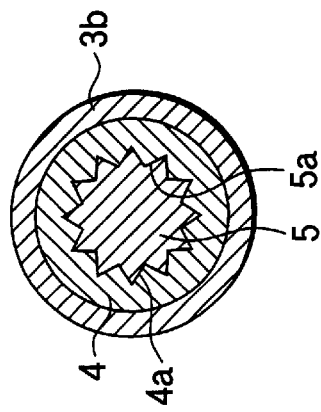
FIG.1A
FIG.1B

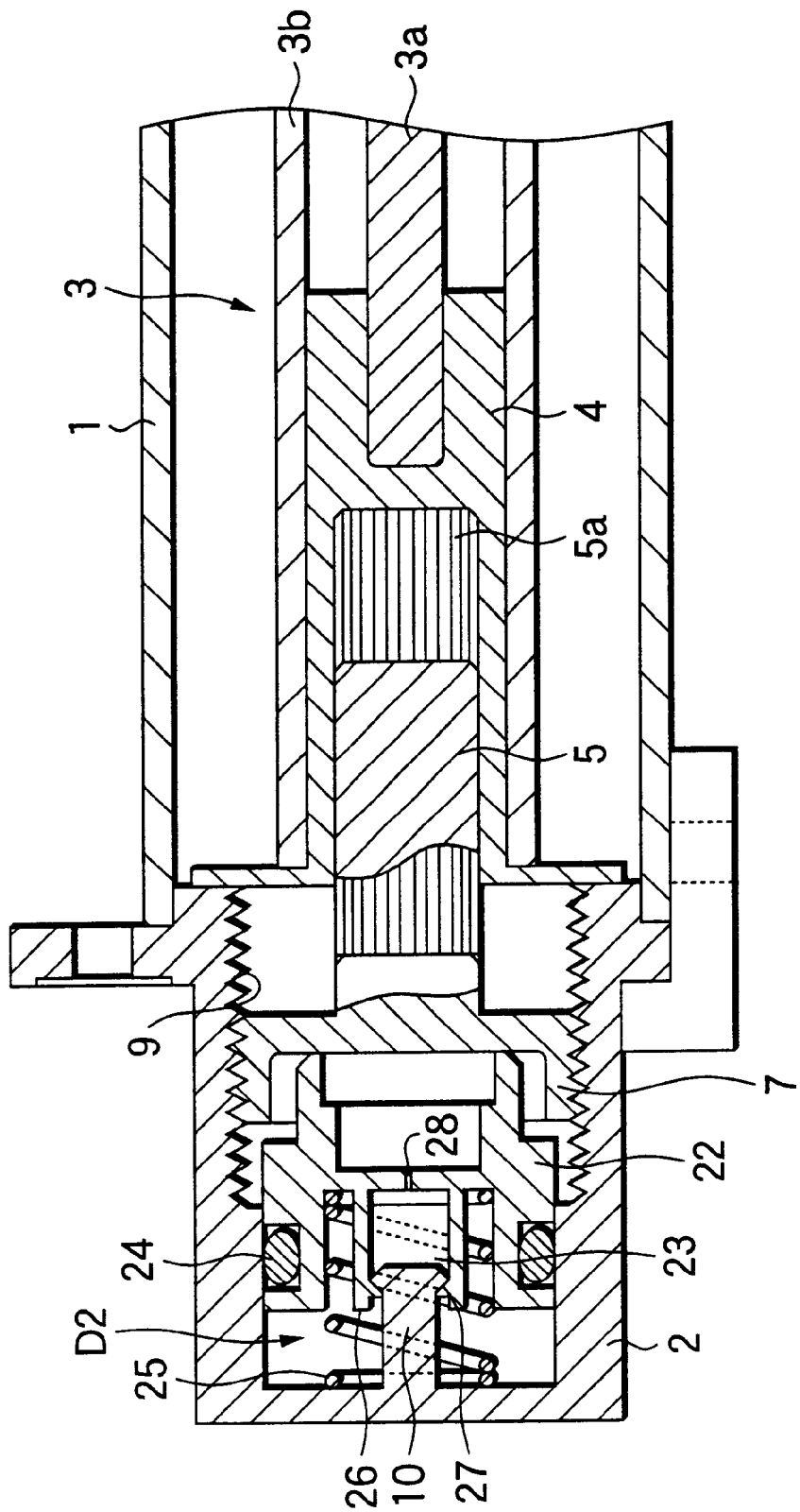

APPARATUS FOR WINDING SHEET-LIKE ELEMENT

BACKGROUND OF THE INVENTION

1. Field of the Invention

The present invention relates to the improvement of a winding apparatus for winding a sheet-like element, such as a tonneau cover for closing a rear cargo room of an automobile, and a sunshade for covering the door glass of an automobile.

2. Description of the Related Art

One such conventional winding apparatus is disclosed in JP-59-185148U.

This conventional winding apparatus was developed for winding a tonneau cover of an automobile. Although not shown concretely, this conventional winding apparatus consists mainly of an accommodating case fixed to a rear-cargo-room-side portion of an automobile, a winding shaft, disposed in this accommodating case, for winding a tonneau cover, pushing means for rotating and pushing this winding shaft in a winding direction in which the tonneau cover is wound therearound, and a spring member serving as a damping means to be brought into elastic contact with a surface of the tonneau cover to be wound around the winding shaft.

Therefore, when an end portion of the tonneau cover is drawn from an opening in the accommodating case in which the winding shaft is disposed, the tonneau cover is gradually drawn therefrom against the turning/pushing force of the aforementioned pushing means. Then, the end portion of the tonneau cover is caught at a backpanel-side portion facing a back seat. This enables the closing of the rear cargo room. Conversely, when the state, in which the end portion of the tonneau cover is caught at the backpanel-side portion, is canceled, the tonneau cover is automatically wound around the winding shaft this time by the turning/pushing force of the pushing means. Near the end of this winding operation, the aforementioned spring member comes into elastic contact with the surface of the tonneau cover. Thus, the spring member provides a damping force thereto so as to damp the winding speed of the winding apparatus. Consequently, the tonneau cover is slowly wound by the winding apparatus. Hence, the end portion of the tonneau cover is prevented from strongly hitting an opening edge of the accommodating case and producing impact sounds, and from being damaged.

However, when the conventional winding apparatus is in a state in which the tonneau cover is once drawn out and in which the rear cargo room is closed, the diameter of the outer peripheral portion of the winding shaft is reduced by an amount corresponding to a drawn-out part of the tonneau cover. Thus, the aforementioned spring member serving as the damping means does not act. Conversely, in the case that the tonneau cover is initially drawn out, the diameter of the outer peripheral portion of the winding shaft is larger than that in the state, in which the tonneau cover is drawn out, by an amount corresponding to a wound part of the tonneau cover. Thus, at that time, the damping force of the spring member acts thereon, so that an excessive force is required for drawing out the tonneau cover. Consequently, it is incontrovertible that the feeling of use thereof is deteriorated.

SUMMARY OF THE INVENTION

The invention is developed to effectively solve the problems of the conventional winding apparatus. According to the invention, there is provided a sheet-like element winding apparatus (hereunder referred to as a first winding apparatus of the invention) having an accommodating case, at one end portion of which a cap is attached to, and also having a winding shaft, disposed in the accommodating case, for winding a sheet-like element, and a pushing means for rotating and pushing the winding shaft in a direction in which the sheet-like element is wound. The first winding apparatus comprises a clutch mechanism provided at an end portion of the winding shaft. When a sheet-like element is wound, the winding shaft is connected through the clutch mechanism to a damping means for providing a damping force to the winding shaft. When a sheet-like element is drawn out, the connection between the winding shaft and the damping means is canceled through the clutch mechanism.

According to an embodiment (hereunder referred to as a second winding apparatus of the invention) of the first winding apparatus of the invention, the damping means is an oil damper.

According to an embodiment (hereunder referred to as a third winding apparatus of the invention) of the first winding apparatus of the invention, the damping means is an air damper.

According to an embodiment (hereunder referred to as a fourth winding apparatus of the invention) of the second winding apparatus of the invention, a shaft portion is provided in the cap attached to the one end portion of the accommodating case. Further, an insertion hole, into which the shaft portion is inserted, is provided in an inner-member-side portion of the oil damper.

According to an embodiment (hereunder referred to as a fifth winding apparatus of the invention) of the first winding apparatus of the invention, the clutch mechanism has two clutch surfaces to be press-contacted with each other. Further, one of the clutch surfaces is held in such a way as to be able to move in a direction of an axis of the winding shaft, and as to be unable to move in a circumferential direction thereof. Furthermore, projections are provided on an outer periphery of the one of the clutch surfaces. Moreover, a threaded surface is formed on an inner periphery of the accommodating case or the cap. Further, the projections and the threaded surface are screwed.

According to an embodiment (hereunder referred to as a sixth winding apparatus of the invention) of the third winding apparatus of the invention, a shaft portion is provided in the cap attached to the one end portion of the accommodating case. Further, an insertion hole, into which the shaft portion is inserted, is provided in a piston-side portion of the air damper. Moreover, an engaging portion is provided between the insertion hole and the shaft portion.

According to an embodiment (hereunder referred to as a seventh winding apparatus of the invention) of the fifth winding apparatus of the invention, opposed ratchet-like teeth are provided in a row in a circumferential direction on each of two press-contacted clutch surfaces of the clutch mechanism.

Thus, according to the first winding apparatus of the invention, when the sheet-like element is wound, the winding shaft and the damping means are connected to each other through the clutch mechanism. Thus, similarly as the case of the conventional winding apparatus, the sheet-like element is slowly wound around the winding shaft. Conversely, when the sheet-like element is drawn out, the connection between the winding shaft and the damping means is canceled through the clutch mechanism. Thus, the sheet-like element can smoothly be drawn out with a small force and without receiving the damping force of the damping means.

According to the second and third winding apparatuses of the invention, an oil damper or an air damper is used as the damping means, so that a nearly constant damping force is obtained and that the setting of the damping force is facilitated, whereas the conventional winding apparatus employs a simple spring member, so that as it becomes closer to the end of an operation of winding the sheet-like element, the damping force increases, and that sometimes, the sheet-like element is not completely wound.

According to the fourth winding apparatus of the invention, the oil damper is simply attached to the cap side portion only by inserting the haft portion provided in the cap into the insertion hole provided in the inner member of the oil damper. Thus, an assembling operation is facilitated. According to the fifth winding apparatus of the invention, one of the clutch surfaces of the clutch mechanism is press-contacted with the other clutch surface thereof with the progress of the screwing of the projection and the threaded surface, so that the winding shaft and the damping means are connected to ea other. Thus, when the sheet-like element is wound, the damping force can be provided only when the winding is finished.

According to the sixth winding apparatus of the invention, the air damper is attached to the cap side portion only by inserting the shaft portion, which is provided in the cap, into the insertion hole provided in the piston of the air damper. Thus, the assembling operation is facilitated. Moreover, the moving range of the piston can be restrained by the presence of the engaging portion. According to the seventh winding apparatus of the invention, the ratchet-like teeth are provided on the two press-contacted clutch surfaces of the clutch mechanism in the circumferential direction, so that the connection between the winding shaft and the damping means is reliably established and canceled.

BRIEF DESCRIPTION OF THE DRAWINGS

FIG. 1A is a main part sectional view illustrating a winding apparatus according to a first embodiment of the invention, and FIG. 1B is a sectional view taken on line A—A of FIG. 1A;

FIG. 9 is a main part sectional view illustrating a state of this winding apparatus that is in the middle of an operation of winding of a sheet-like element;

DETAILED DESCRIPTION OF THE PREFERRED EMBODIMENTS

Figure 2:
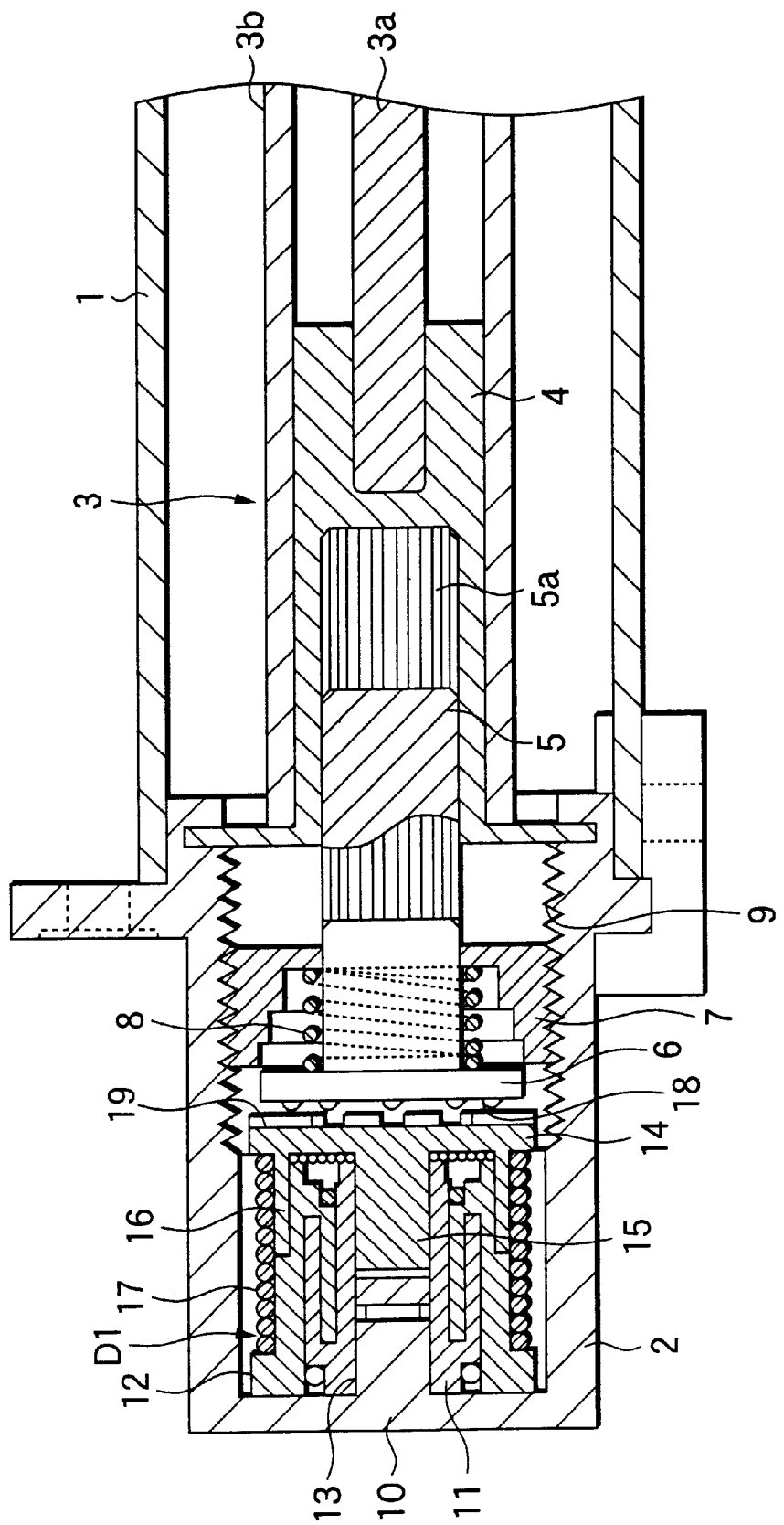
FIG. 2 is a main part sectional view illustrating a state of this winding apparatus that is in the middle of an operation of winding of a sheet-like element.

Now, a description will be given in more detail of preferred embodiments of the present invention with reference to the accompanying drawings.

Hereinafter, preferred embodiments of the invention are described in detail with reference to the accompanying drawings.

First, a winding apparatus according to a first embodiment employs an oil damper D1 as the damping means. As illustrated in FIGS. 1A and 1B, the winding apparatus according to the first embodiment comprises an accommodating case 1, at an end portion of which a cap 2 is attached, and also comprises a winding shaft 3, disposed in this accommodating case 1, for winding a sheet-like element (not shown), such as a tonneau cover and a sunshade, and a pushing means (not shown), provided at the other-end-portion-side part of the accommodating case 1 and constituted by a torsion spring, for rotating and pushing the winding shaft 3 in a direction in which the sheet-like element is wound. The winding apparatus according to the first embodiment features the following constituent elements employed therein. Incidentally, the aforementioned winding shaft 3 comprises an inner fixed shaft 3a and an outer rotating barrel 3b.

Further, according to the first embodiment, a cylindrical rotor 4 adapted to form a concave-convex shape 4a and to rotate together with the rotating barrel 3b is provided in the end portion of the winding shaft 3. Moreover, an end portion of the clutch shaft 5, on an outer peripheral surface of which a concave-convex shape 5a being similar to the concave-convex shape 4a is formed, is inserted into the rotor 4. Therefore, the clutch shaft 5 is held in a state in which the clutch shaft 5 can move in the direction of the axis of the winding shaft, and cannot move in the circumferential direction thereof.

Further, this clutch shaft 5 is constructed so that a first clutch plate 6 is provided on the rear end portion side part thereof, that a male threaded block 7 to be screwed into a female threaded surface 9 formed in an inner surface portion of a cap 2 (to be described later) is movably provided in a middle portion thereof, and that a compression coil spring 8 is interposed between this male threaded plate 7 and the first clutch plate 6.

The female threaded surface 9, into which the male threaded block 7 of the aforementioned clutch shaft 5, is formed in a part of the inner periphery to an inlet part thereof. Moreover, a shaft portion 10 is erected on a bottom-portion-side part thereof. Furthermore, an oil damper D1 is attached to this shaft portion 10. In this case, as illustrated in this figure, the oil damper D1 can easily be attached to the cap side portion 2 by providing an insertion hole 13 in the inner member 11 of the oil damper D1 and then inserting the shaft portion 10 into this insertion hole 13.

Further, a shaft portion 15 of a second clutch plate 14 engaging with the first clutch plate 6 is rotatably inserted into the insertion hole 13, which is formed in the inner member 11 of this oil damper D1, from the opposite direction. A oneway spring 17 is fitted onto the outer periphery of the outer member 12, which is made to be flush with a cylindrical portion 16 by putting the cylindrical portion 16 of the second clutch plate 14 and the outer member 12 of the oil damper D1 together. Incidentally, a plurality of small projections 18 are formed on the first clutch plate 6 and arranged in the circumferential direction thereof. A plurality of ribs 19 are formed on the second clutch plate 14 and arranged in the circumferential direction thereof. Then, these clutch surface are engaged with each other.

Thus, in the case that the sheet-like element is drawn out of an opening of the accommodating case 1 in the winding apparatus of such a configuration, as illustrated in FIG. 1A, the first clutch plate 6 provided at the side of the clutch shaft 5 is detached from the second clutch plate 14 provided at the side of the oil damper D1. Therefore, the oil damper D1 is not connected to the winding shaft 3. Thus, the clutch shaft 5 runs idle, so that the sheet-like element can smoothly be drawn out with a small force.

Conversely, when the sheet-like element is wound around the winding shaft 3, first, the sheet-like element is wound therearound by the turning/pushing force of the pushing means that is operative to rotate and push the winding shaft 3 in a direction in which the sheet-like element is wound. As illustrated in FIG. 2, the male threaded block 7 provided on the clutch shaft 5 is screwed into the female threaded surface 9 of the cap 2 by being interlocked with the rotation of this winding shaft 3. Thus, the male threaded block 7 advances to the left, as viewed in this figure. Consequently, the spring pressure of the compression coil spring 8 is provided thereto, so that the clutch shaft 5 is moved in the same direction. Hence, the first clutch plate 6 and the second clutch plate 14 are gradually press-contacted with each other.

Figure 3:
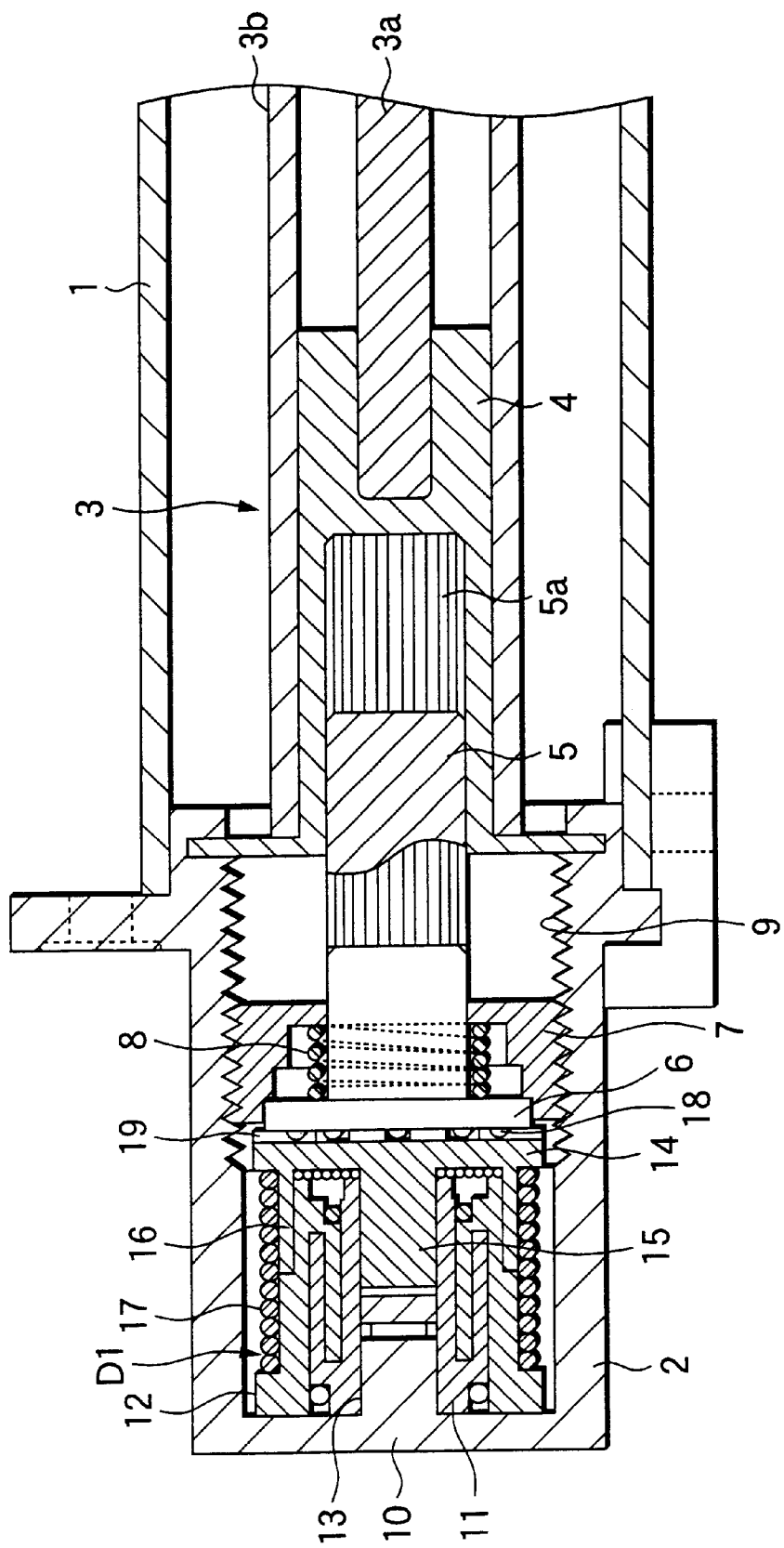
FIG. 3 is a main part sectional view illustrating a state of this winding apparatus that finishes the operation of winding the sheet-like element.

Then, as illustrated in FIG. 3, the first clutch plate 6 and the second clutch plate 14 are completely press-contacted with each other this time. Thus, the second clutch plate 14 rotates in a predetermine direction together with the outer member 12 of the oil damper D1 by the action of the oneway spring 17. At that time, a damping force due to the viscosity of oil filled into the space between the outer member 12 and the inner member 11 of the oil damper D1 acts upon the rotation of the second clutch plate 14. Then, this damping force is transmitted from the clutch shaft 5 to the winding shaft 3, so that the rotating speed of the winding shaft 3 is reduced. Consequently, the sheet-like element comes to be slowly wound around the winding shaft 3 from halfway through the winding operation. Thus, the end portion of the sheet-like element is prevented from strongly hitting the opening edge of the accommodating case 1, from producing impact sounds, and from damaging the opening edge of the accommodating case 1.

Furthermore, in the case that the sheet-like element is drawn out again after the sheet-like element is completely wound around the winding shaft 3, the winding shaft 3 is reversed this time. Thus, the first clutch plate 6 and the second clutch plate 14 having been engaged with each other are turned in the opposite directions. Thus, the oneway spring 17 is enlarged, so that the connection between the second clutch plate 14 and the outer member 12 of the oil damper D1 is canceled. Then, this time, the second clutch plate 14 runs idle. The male threaded block 7 is forward screwed together with the clutch shaft 5 in the reverse direction and returned to the state illustrated in FIGS. 1A and 1B. This permits the apparatus to smoothly draw out the sheet-like element.

Figure 4:
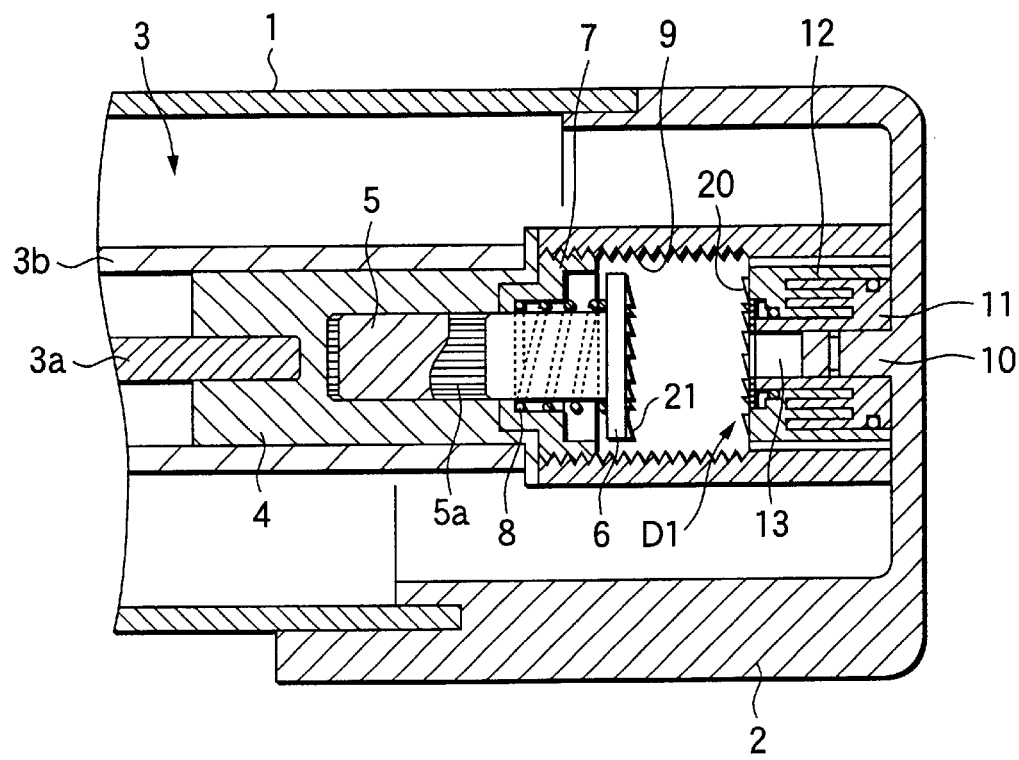
FIG. 4 is a main part sectional view illustrating a winding apparatus according to a second embodiment of the invention.

Next, a winding apparatus according to a second embodiment of the invention is described hereinbelow. Similarly, the winding apparatus according to the second embodiment employs the oil damper D1 as the damping means. Thus, the second embodiment employs the basic part of the configuration of the first embodiment without change. The differences between the second and first embodiments reside in that as illustrated in FIG. 4, the ratchet-like teeth 20 are directly provided in arrow in the circumferential direction the outer member 12 of the oil damper D1 attached to the shaft portion 10 of the cap 2 in the second embodiment without using the independent second clutch plate 14, and that the corresponding ratchet-like teeth 21 are provided in a row on the first clutch plate 6 of the clutch shaft 5, which faces the ratchet-like teeth 20, in the circumferential direction thereof. Therefore, in the second embodiment, the oneway spring 17 is unnecessary as a result of omitting the second clutch plate 14.

Thus, in the case that the sheet-like element is drawn out of an opening of the accommodating case 1 in the winding apparatus of such a configuration, as illustrated in FIG. 4, the ratchet-like teeth 21 provided at the side of the first clutch plate 6 is detached from the ratchet-like teeth 20 provided at the side of the outer member 12. Therefore, the oil damper D1 is not connected to the winding shaft 3. Thus, the clutch shaft 5 runs idle, so that the sheet-like element can smoothly be drawn out with a small force.

Figure 5:
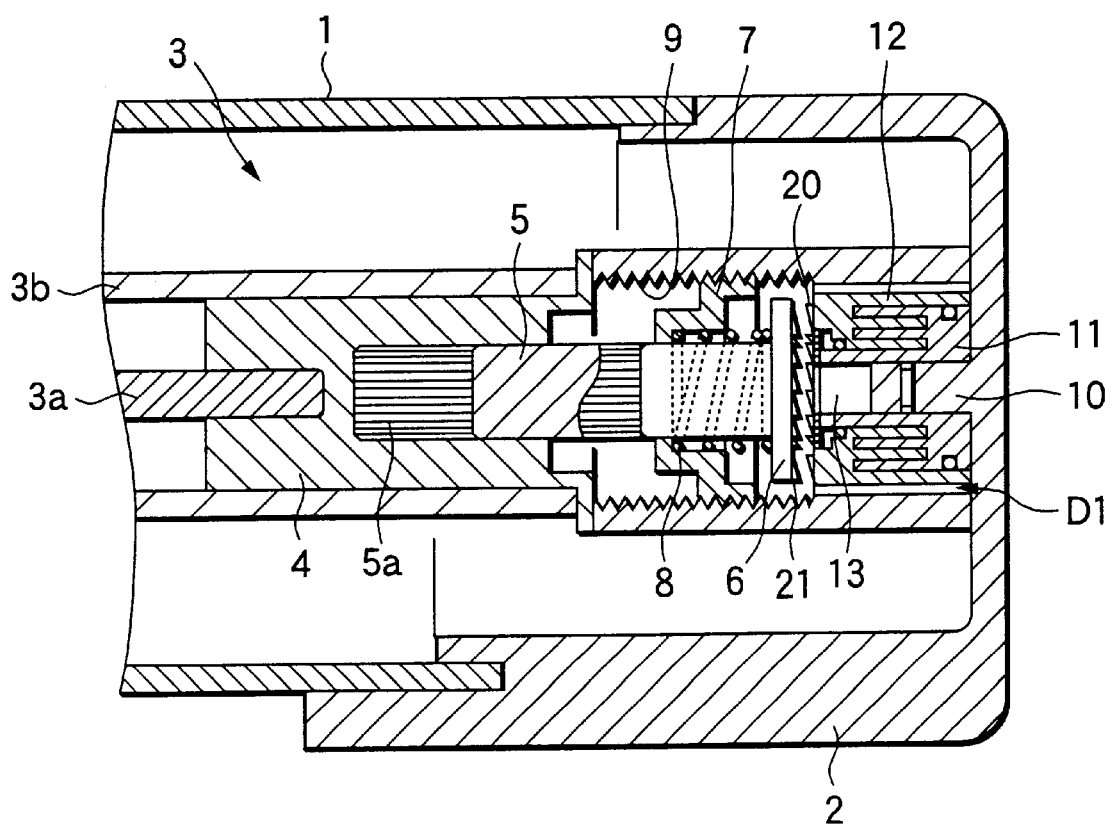
FIG. 5 is a main part sectional view illustrating a state of this winding apparatus that is in the middle of an operation of winding of a sheet-like element.

Conversely, when the sheet-like element is wound around the winding shaft 3, first, the sheet-like element is wound therearound by the turning/pushing force of the pushing means that is operative to rotate and push the winding shaft 3 in a direction in which the sheet-like element is wound. As illustrated in FIG. 5, the male threaded block 7 provided on the clutch shaft 5 is screwed into the female threaded surface 9 of the cap 2 by being interlocked with the rotation of this winding shaft 3. Thus, the male threaded block 7 advances to the right, as viewed in this figure, to thereby move the clutch shaft 5 in the same direction. Consequently, the ratchet-like teeth 21 provided at the side of the first clutch plate 6 gradually start meshing with the ratchet-like teeth 20 provided at the side of the outer member 12.

Figure 6:
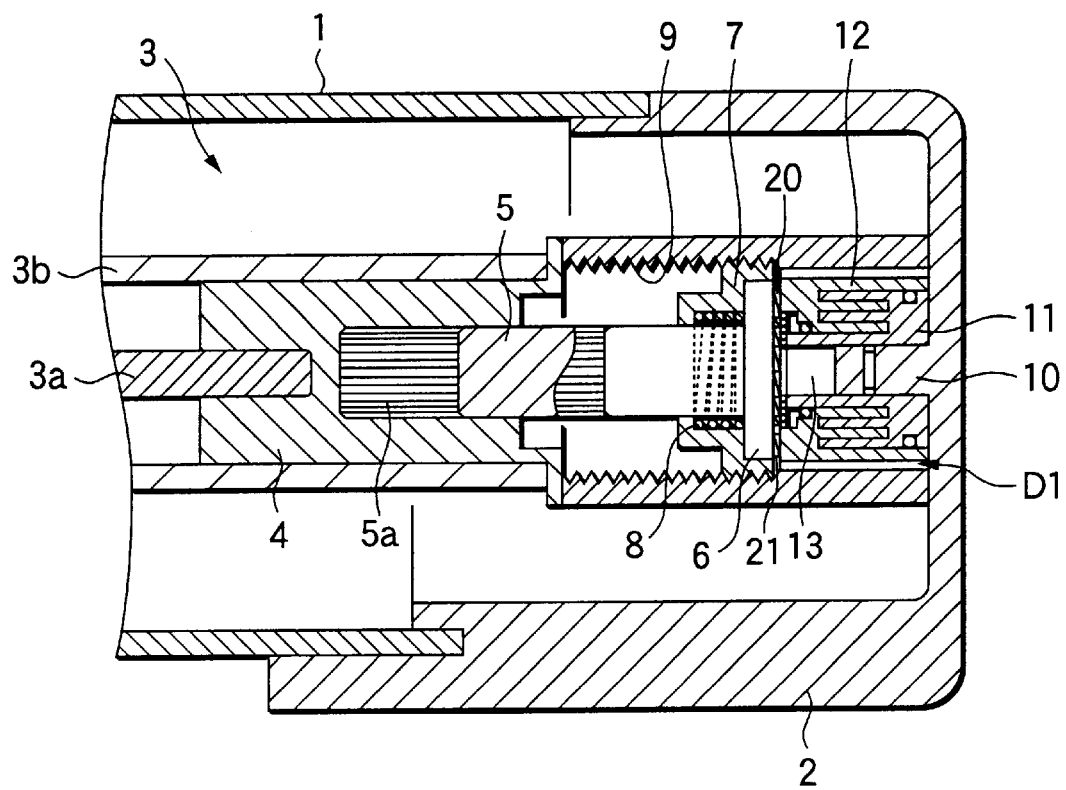
FIG. 6 is a main part sectional view illustrating a state of this winding apparatus that finishes the operation of winding the sheet-like element.

Then, as illustrated in FIG. 6, the ratchet-like teeth 20 and 21 are completely meshed with each other this time. Thus, the outer member 12 of the oil damper D1 rotates in a predetermine direction together with the outer member 12 of the oil damper D1 by the action of the oneway spring 17. At that time, a damping force due to the viscosity of oil filled into the space between the outer member 12 and the inner member 11 of the oil damper D1 acts upon the rotation of the outer member 12. Then, this damping force is transmitted from the clutch shaft 5 to the winding shaft 3, so that the rotating speed of the winding shaft 3 is reduced. Consequently, the sheet-like element comes to be slowly wound around the winding shaft 3 from halfway through the winding operation. Thus, the end portion of the sheet-like element is prevented from strongly hitting the opening edge of the accommodating case 1, from producing impact sounds, and from damaging the opening edge of the accommodating case 1.

Furthermore, in the case that the sheet-like element is drawn out again after the sheet-like element is completely wound around the winding shaft 3, similarly, the winding shaft 3 is reversed this time. Thus, the male threaded block 7 and the clutch shaft 5 are forward screwed together in the opposite direction. Simultaneously, the ratchet-like teeth 21 of the first clutch plate 6 are detached from the ratchet-like teeth 20 of the outer member 12. Thus, the connection between the winding shaft 3 and the damper D1 is canceled. Then, the apparatus is returned to the state illustrated in FIG. 4. This permits the apparatus to smoothly draw out the sheet-like element.

Figure 7:
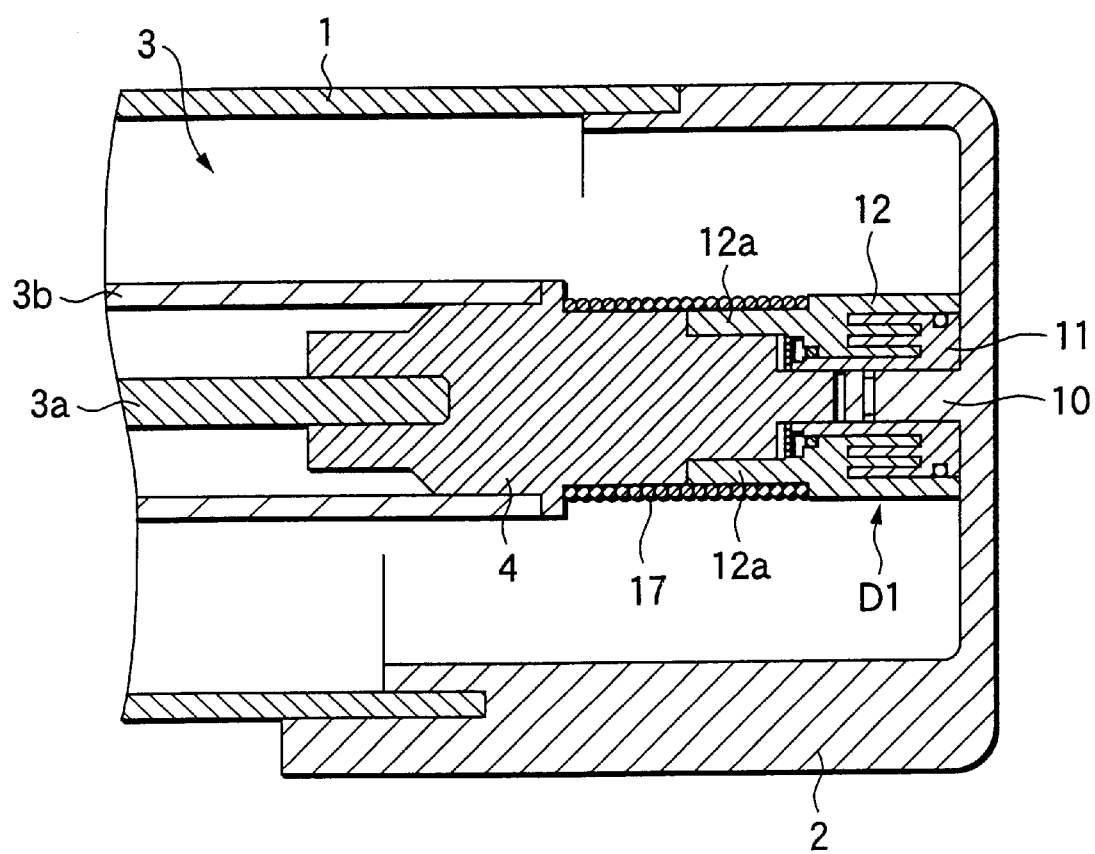
FIG. 7 is a main part sectional view illustrating a winding apparatus according to a third embodiment of the invention.

Next, a winding apparatus according to a third embodiment is described hereinbelow. The winding apparatus according to the third embodiment employs the oil damper D1 as the damping means, similarly as the first and second embodiments. The third embodiment differs from the first and second embodiments in that the configuration of the embodiment is simplified still more, that as illustrated in FIG. 7, a column-like rotor 4 adapted to rotate together with the rotating barrel 3b is provided in the end portion of the winding shaft 3 in such a way as to protrude therefrom, that a part of the outer member 12 of the oil damper D1 attached to the shaft portion 10 at the side of the cap 2 is extended, and that the oneway spring 17 is fitted onto the outer periphery of each of the extension portion 12a of the outer member 12 and the rotor 4, which are flush with each other.

Thus, in the case that the sheet-like element is drawn out of an opening of the accommodating case 1 in the winding apparatus of such a configuration, although not shown concretely, when the end portion of the sheet-like element is drawn out, the oneway spring 17 is enlarged as the winding shaft 3 rotates. Thus, the connection between the rotor 4 and the outer member 12 of the oil damper D1 the first clutch plate 6 is immediately canceled. The rotor 4 runs idle, so that the sheet-like element can smoothly be drawn out with a small force.

Conversely, in the case that the sheet-like element is wound, as a consequence, the sheet-like element is wound around the winding shaft 3 by the turning/pushing force of the pushing means, which is operative to rotate and push the sheet-like element in a direction in which the sheet-like element is wound therearound. However, differently from the first and second embodiments, the third embodiment is configured so that the rotor 4 and the outer member 12 of the oil damper D1 are connected by the oneway spring 17, that a damping force due to the viscosity of oil filled into the space between the outer member 12 and the inner member 11 of the oil damper D1 is applied to the rotation of the outer member 12 from the beginning by being interlocked with the rotation of the winding shaft 3. This damping force is transmitted from the rotor 4 to the winding shaft 3, so that the rotating speed of the winding shaft 3 is decreased. Consequently, the sheet-like element is slowly wound around the winding shaft 3 from the beginning. Thus, the end portion of the sheet-like element is prevented from strongly hitting the opening edge of the accommodating edge of the casing 1, from producing impact sounds, and from damaging the opening edge of the accommodating case 1.

Figure 8A:
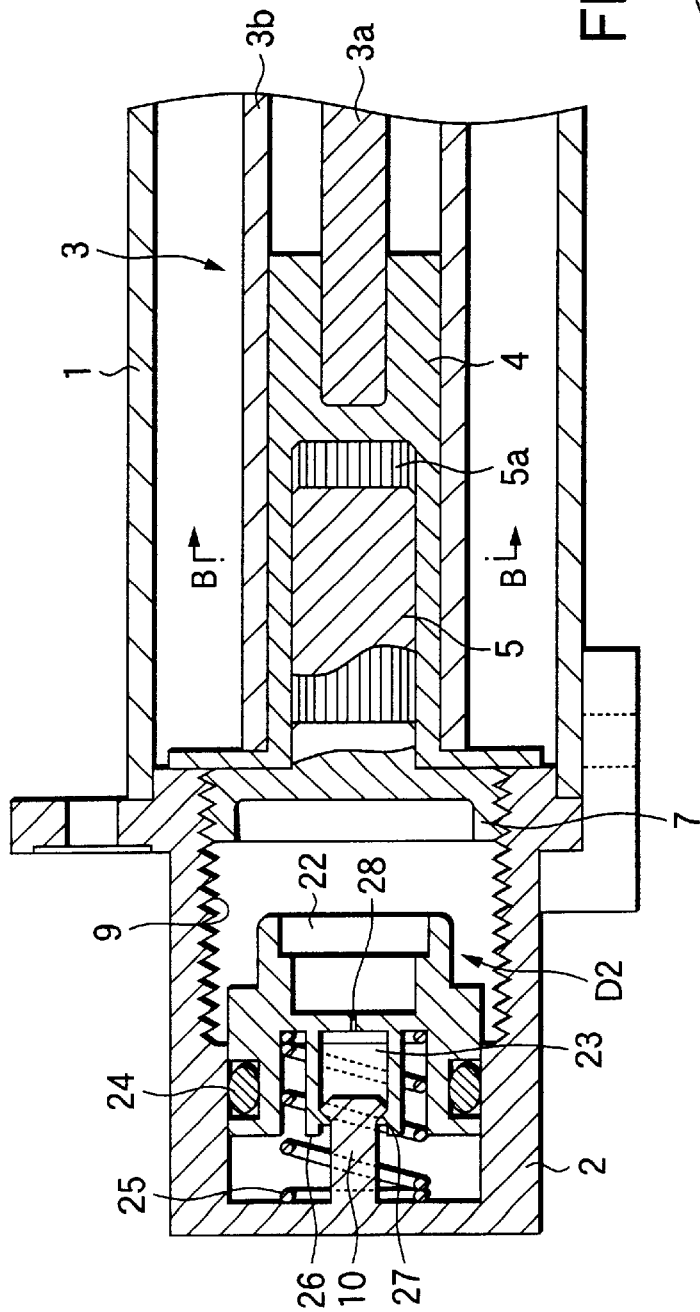
FIG. 8A is a main part sectional view illustrating a winding apparatus according to a fourth embodiment of the invention.
Figure 8B:
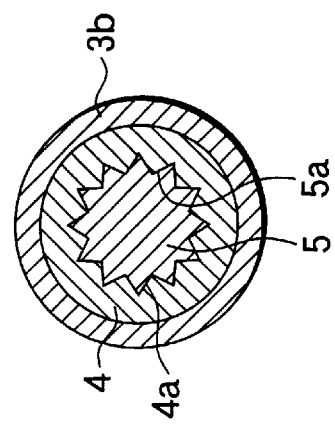
FIG. 8B is a sectional view taken on line B—B of FIG. 8A.

Finally, a winding apparatus according to a fourth embodiment of the invention is described hereinbelow. The fourth embodiment differ from the embodiments described hereinabove in that the fourth embodiment features an air damper D2 used as the damping means. As illustrated in FIGS. 8A and 8B, a cylindrical rotor 4 adapted to form a concave-convex shape 4a on the inner peripheral surface in the terminal portion of the winding shaft 3 and to rotate together with the rotating barrel 3b is provided in the winding shaft 3. Moreover, an end portion of the clutch shaft 5 having an outer peripheral surface, on which a concave-convex shape 5a being similar to the concave-convex shape 4a is formed, and also having a rear end portion on which a male threaded block 7 to be screwed into a female threaded surface 9 of the cap 2 is integrally formed, is inserted into the rotor 4. Therefore, this clutch shaft 5 is held in a state in which the clutch shaft 5 can move in the direction of the axis of the winding shaft 3, and cannot move in the circumferential direction thereof, similarly as that of the first embodiment.

A piston 22, to which an O-ring 24 is attached, is movably attached to the side of the cap 2 by erecting a shaft portion 10 on the bottom of the cap 2 and by inserting the shaft portion 10 into an insertion hole 23 provided in the piston 22. Moreover, a compression coil spring 25 is interposed between the bottom portions of the piston 22 and the cap 2, so that the piston 22 is pushed in the direction of the clutch shaft 5. The pushing position, at which this piston 22 is pushed, is regulated by the engagement between a claw portion 26, which serves as an engaging portion formed on a hole edge of the insertion hole 23, and a claw portion 27 serving as an engaging portion formed at an end of the shaft portion 10. Incidentally, in this figure, reference numeral 28 designates an orifice opened in the piston 22.

Thus, in the case that the sheet-like element is drawn out of an opening of the accommodating case 1 in the winding apparatus of such a configuration, as illustrated in FIG. 8A, the piston 22 of the air damper D2 and the male threaded block 7 of the clutch shaft 5 are detached from each other. Therefeore, the air damper D2 is not connected to the winding shaft 3. Thus, the clutch shaft 5 runs idle, so that the sheet-like element can smoothly be drawn out with a small force.

Conversely, when the sheet-like element is wound around the winding shaft 3, first, the sheet-like element is wound therearound by the turning/pushing force of the pushing means that is operative to rotate and push the winding shaft 3 in a direction in which the sheet-like element is wound. As illustrated in FIG. 9, the male threaded block 7 provided on the clutch shaft 5 is screwed into the female threaded surface 9 of the cap 2 by being interlocked with the rotation of this winding shaft 3. Thus, the male threaded block 7 advances to the left, as viewed in this figure. Consequently, the clutch shaft 5 is moved in the same direction. Hence, the first clutch shaft 5 and the piston 22 are gradually press-contacted with each other.

Figure 10:
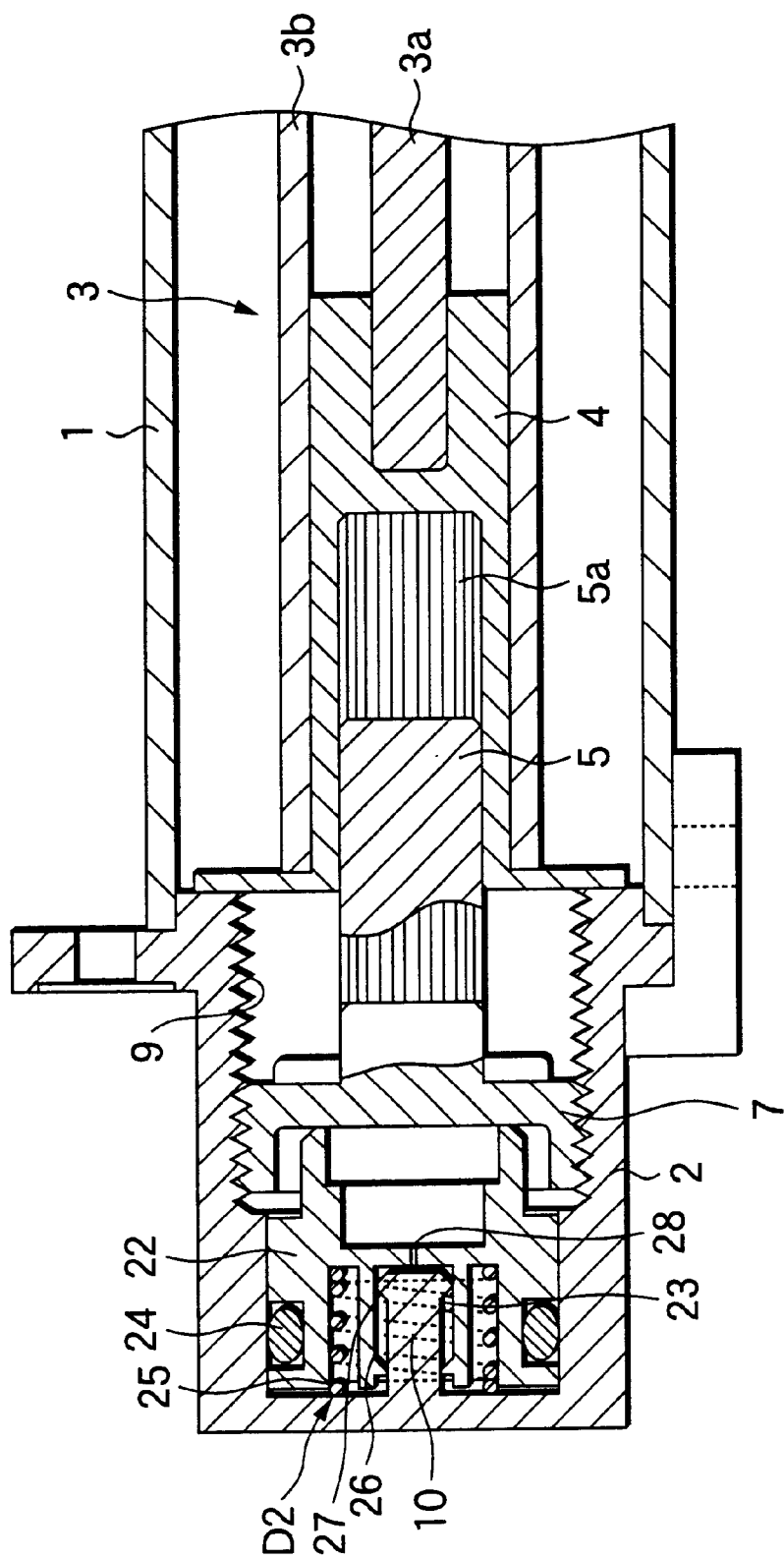
FIG. 10 is a main part sectional view illustrating a state of this winding apparatus that finishes the operation of winding the sheet-like element.
Figure 11:
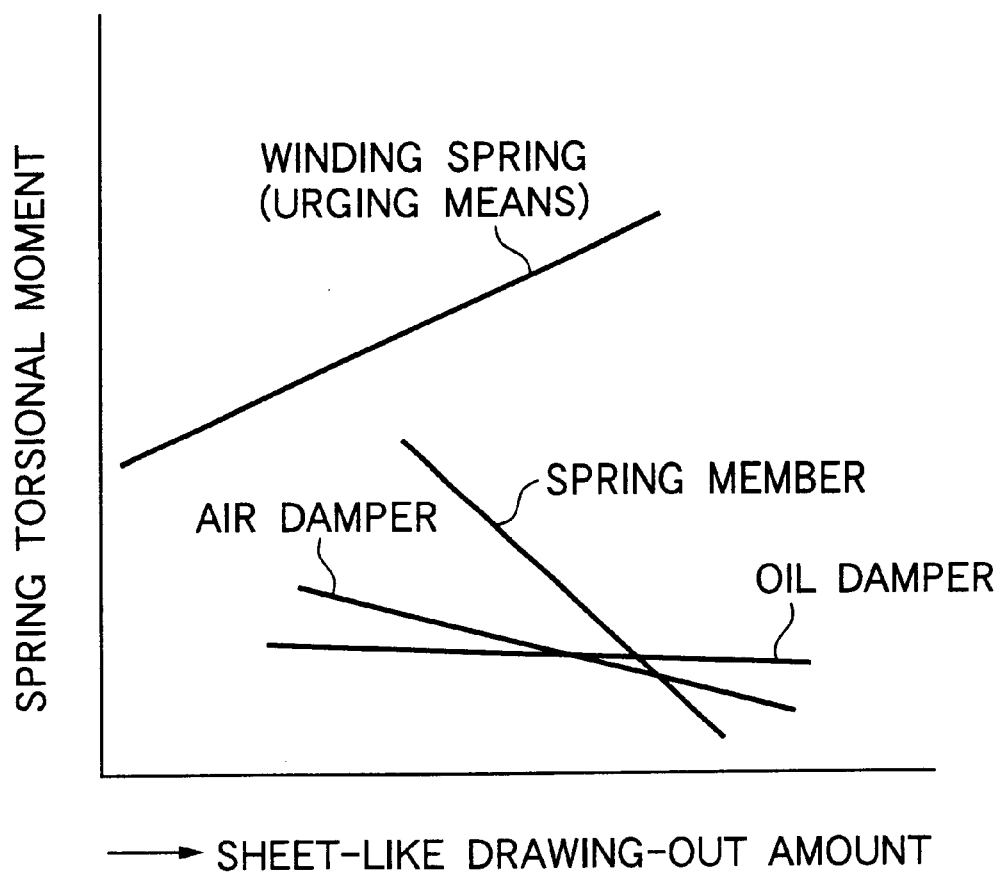
FIG. 11 is a graph illustrating for comparison among the damping forces of a conventional spring member, and an oil damper and an air damper according to the invention.

Then, as illustrated in FIG. 10, the clutch shaft 5 and the piston 22 are completely press-contacted with each other this time. Thus, the clutch shaft 5 pushes the piston 22 against the spring pressure of the compression coil spring 25 to the bottom portion side of the cap 2 during the clutch shaft 5 rotates. At that time, a damping force is caused by the movement of the piston 22. This damping force is transmitted from the clutch shaft 5 to the winding shaft 3, so that the rotating speed of the winding shaft 3 is reduced. Consequently, similarly, the sheet-like element comes to be slowly wound around the winding shaft 3 from halfway through the winding operation. Thus, the end portion of the sheet-like element is prevented from strongly hitting the opening edge of the accommodating case 1, from producing impact sounds, and from damaging the opening edge of the accommodating case 1.

Furthermore, in the case that the sheet-like element is drawn out again after the sheet-like element is completely wound around the winding shaft 3, the winding shaft 3 is reversed when an end portion of the sheet-like element is drawn out of the opening of the accommodating case 1. Then, the male threaded block 7 is forward screwed together with the clutch shaft 5 in the reverse direction. Simultaneously, the piston 22 and the male threaded block 7 are detached from each other. The connection between the winding shaft 3 and the air damper D2 is canceled. Then, the apparatus is returned to the state illustrated in FIGS. 8A and 8B. This permits the apparatus to smoothly draw out the sheet-like element.

Incidentally, as already described, the conventional winding apparatus employs a simple spring member as the damping means, so that as it becomes closer to the end of an operation of winding the sheet-like element, the damping force increases, and that sometimes, the sheet-like element is not completely wound. In contrast, according to the embodiments each employing the oil damper D1 or the air damper D2 as the damping means, so that a nearly constant damping force is obtained and that the setting of the damping force is facilitated.

As described above, the invention employs the aforementioned configuration, so that when the sheet-like element is wound, the winding shaft and the damping means are connected through the clutch mechanism, and that the sheet-like element is slowly wound around the winding shaft, similarly as the case of the conventional winding apparatus. Conversely, when the sheet-like element is drawn out, the connection between the winding shaft and the damping means is canceled through the damping means. Thus, the sheet-like element can smoothly be drawn out with a small force and without receiving the damping force of the damping means.

What is claimed is:

1. A sheet-like element winding apparatus, comprising:
    an accommodating case having a cap attached at one end portion thereof;
    a winding shaft disposed in said accommodating case, for winding a sheet-like element;
    damping means for providing a damping force to said winding shaft, wherein the damping means is disposed in the cap; and
    a clutch mechanism that connects said winding shaft to said damping means when a majority of said sheet-like element is wound around said winding shaft and is being wound onto said winding shaft, and that disconnects said winding shaft from said damping means when said sheet-like element is being unwound from said winding shaft, wherein said winding shaft is disconnected from said damping means when said sheet-like element is being wound onto said winding shaft before said clutch mechanism connects said winding shaft to said damping means.

2. The sheet-like element winding apparatus according to claim 1, wherein said damping means comprises an oil damper.

3. The sheet-like element winding apparatus according to claim 1, wherein said damping means comprises an air damper.

4. The sheet-like element winding apparatus according to claim 2, wherein a shaft portion is provided in said cap attached to said one end portion of said accommodating case, and wherein an insertion hole, into which said shaft portion is inserted, is provided in an inner-member-side portion of said oil damper.

5. The sheet-like element winding apparatus according to claim 1, wherein said clutch mechanism comprises two clutch surfaces to be press-contacted with each other, wherein one of said clutch surfaces is held in such a way as to be able to move in a direction of an axis of said winding shaft, and as to be unable to move in a circumferential direction thereof, wherein threaded projections are provided on an outer periphery of said one of said clutch surfaces, wherein a threaded surface is formed on an inner periphery of said accommodating case or said cap, and wherein said threaded projections and said threaded surface are threaded together.

6. The sheet-like element winding apparatus according to claim 3, wherein a shaft portion is provided in said cap attached to said one end portion of said accommodating case, wherein an insertion hole, into which said shaft portion is inserted, is provided in a piston-side portion of said air damper, and wherein an engaging portion is provided between said insertion hole and said shaft portion.

7. The sheet-like element winding apparatus according to claim 5, wherein opposed ratchet-like teeth are provided in a row in a circumferential direction on each of two press-contacted clutch surfaces of said clutch mechanism.

8. The sheet-like element winding apparatus according to claim 1, wherein said clutch mechanism comprises two clutch surfaces to be press-contacted with each other.

9. The sheet-like element winding apparatus according to claim 8, wherein one of said clutch surfaces is held in such a way as to be able to move in a direction of an axis of said winding shaft, and as to be unable to move in a circumferential direction thereof.

10. The sheet-like element winding apparatus according to claim 8, wherein threaded projections are provided on an outer periphery of said one of said clutch surfaces.

11. The sheet-like element winding apparatus according to claim 10, wherein a threaded surface is formed on an inner periphery of said accommodating case or said cap.

12. The sheet-like element winding apparatus according to claim 11, wherein said threaded projections and said threaded surface are threaded together.

13. A winding apparatus comprising:
    a winding shaft that windingly receives a sheet;
    a damper that damps said winding shaft, wherein the damper is in a cap; and
    a clutch that connects said winding shaft to said damper when a majority of said sheet is wound around said winding shaft and when being wound around said winding shaft, and that disconnects said winding shaft from said damper when said sheet is being unwound from around said winding shaft, wherein said winding shaft is disconnected from said damper when being wound around said winding shaft before said clutch connects said winding shaft to said damper.

14. The apparatus of claim 13, wherein said damper comprises an air damper.

15. The apparatus of claim 14, further comprising a shaft portion in said cap and attached to said one end portion of said case.

16. The apparatus of claim 15, wherein said air damper comprises an insertion hole in a piston-side portion that receives said shaft portion.

17. The apparatus of claim 16, further comprising an engaging portion between said insertion hole and said shaft portion.

18. The apparatus of claim 13, wherein said clutch comprises two clutch surfaces.

19. The apparatus of claim 18, wherein one of said clutch surfaces is movable along an axial direction of said winding shaft.

20. The apparatus of claim 19, wherein said one of said clutch surfaces threadably engages an inner peripheral surface of one of said case and said cap.

21. The apparatus of claim 20, wherein each of said two clutch surfaces comprises ratchet-like teeth.

22. A sheet-like element winding apparatus, comprising:
    an accommodating case having a cap attached at one end portion thereof
    a winding shaft disposed in said accommodating case, for winding a sheet-like element;
    damping means for providing a damping force to said winding shaft, wherein the damping means is disposed in the cap; and a clutch mechanism that connects said winding shaft to said damping means in the middle of winding said sheet-like element around said winding shaft, and that disconnects said winding shaft from said damping means when said sheet-like element is being unwound from said winding shaft, wherein said winding shaft is disconnected from said damping means when said sheet-like element is being wound onto said winding shaft before said clutch mechanism connects said winding shaft to said damping means.

23. The sheet-like element winding apparatus according to claim 22, wherein said damping means comprises an air damper.

24. The sheet-like element winding apparatus according to claim 22, wherein said clutch mechanism comprises two clutch surfaces to be press-contacted with each other, wherein one of said clutch surfaces is held in such a way as to be able to move in a direction of an axis of said winding shaft, and as to be unable to move in a circumferential direction thereof, wherein threaded projections are provided on an outer periphery of said one of said clutch surfaces, wherein a threaded surface is formed on an inner periphery of said accommodating case or said cap, and wherein said threaded projections and said threaded surface are threaded together.

25. The sheet-like element winding apparatus according to claim 23, wherein a shaft portion is provided in said cap attached to said one end portion of said accommodating case, wherein an insertion hole, into which said shaft portion is inserted, is provided in a piston-side portion of said air damper, and wherein an engaging portion is provided between said insertion hole and said shaft portion.

26. The apparatus of claim 22, further comprising a shaft portion in said cap and attached to said one end portion of said case.

27. The apparatus of claim 26, wherein said damping means comprises an air damper that comprises an insertion hole in a piston-side portion that receives said shaft portion.

28. The apparatus of claim 27, further comprising an engaging portion between said insertion hole and said shaft portion.

29. The apparatus of claim 26, wherein said clutch mechanism comprises two clutch surfaces.

30. The apparatus of claim 29, wherein one of said clutch surfaces is movable along an axial direction of said winding shaft.

31. The apparatus of claim 30, wherein said one of said clutch surfaces threadably engages an inner peripheral surface of one of said case and said cap.

32. The apparatus of claim 30, wherein each of said two clutch surfaces comprises ratchet-like teeth.

* * * * *